United States Patent
Lovett et al.

(10) Patent No.: US 9,322,378 B2
(45) Date of Patent: Apr. 26, 2016

(54) METHODS AND SYSTEMS FOR STARTING AN ENGINE OF A HYBRID VEHICLE

(71) Applicant: Ford Global Technologies, LLC, Dearborn, MI (US)

(72) Inventors: Karin Lovett, Novi, MI (US); Michael Paul Lindlbauer, Canton, MI (US); Mark J. Ferrel, Brighton, MI (US); Paul Stephen Bryan, Belleville, MI (US); Marvin Paul Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/445,955

(22) Filed: Jul. 29, 2014

(65) Prior Publication Data

US 2016/0032880 A1   Feb. 4, 2016

(51) Int. Cl.
| | | |
|---|---|---|
| *F02N 11/08* | (2006.01) | |
| *B60W 20/00* | (2016.01) | |
| *B60W 10/06* | (2006.01) | |
| *B60W 10/08* | (2006.01) | |

(52) U.S. Cl.
CPC ........ *F02N 11/0803* (2013.01); *F02N 11/0829* (2013.01); *B60W 10/06* (2013.01); *B60W 10/08* (2013.01); *B60W 20/20* (2013.01)

(58) Field of Classification Search
CPC ... F02N 11/00; F02N 11/006; F02N 11/0803; F02N 11/0829; B60W 10/10; B60W 10/06; B60W 10/08; B60W 20/20
USPC .......................................................... 701/22
See application file for complete search history.

(56) References Cited

U.S. PATENT DOCUMENTS

| | | | |
|---|---|---|---|
| 6,335,574 B1 | 1/2002 | Ochiai et al. | |
| 8,384,237 B2 | 2/2013 | Nefcy et al. | |
| 8,946,926 B2* | 2/2015 | Eger | B60K 6/30 307/10.1 |
| 9,085,291 B2* | 7/2015 | Fushiki | F02N 11/006 |
| 9,102,328 B2* | 8/2015 | Werner | B60K 6/48 |
| 2004/0099234 A1* | 5/2004 | Tamai | B60K 6/485 123/179.3 |
| 2009/0250280 A1* | 10/2009 | Abe | B60K 6/26 180/65.285 |
| 2011/0040432 A1 | 2/2011 | Kaltenbach et al. | |
| 2012/0143412 A1 | 6/2012 | Bissontz | |
| 2013/0231817 A1 | 9/2013 | Werner et al. | |

FOREIGN PATENT DOCUMENTS

WO       2012085294 A1    6/2012

* cited by examiner

*Primary Examiner* — Thomas Tarcza
*Assistant Examiner* — Tyler J Lee
(74) *Attorney, Agent, or Firm* — David Kelley; Alleman Hall McCoy Russell & Tuttle LLP

(57) ABSTRACT

Systems and methods for starting an engine of a hybrid vehicle that includes two electric machines capable of starting an engine are presented. In one example, one of the two electric machines is selected to start the engine in response to degradation of one or more vehicle components and an engine start request.

19 Claims, 6 Drawing Sheets

METHODS AND SYSTEMS FOR STARTING AN ENGINE OF A HYBRID VEHICLE

FIELD

The present description relates to a system and methods for starting an engine of a hybrid vehicle. The methods may be applied to vehicles that include two different ways of starting an internal combustion engine.

BACKGROUND AND SUMMARY

A hybrid vehicle may be started via an electric machine that both propels the vehicle and acts as a starter. The electric machine may be directly coupled to the engine it starts or it may rotate the engine via a gear set or a clutch. The electric machine may start the engine after the vehicle is initially activated or it may start the engine after the vehicle has been activated for some period of time. However, there may be conditions when the electric machine does not have the capability of starting the engine. For example, the electric machine may not have capability to start the engine if the electric machine is degraded or if the electric machine has insufficient torque to rotate the engine. Therefore, it may be desirable to provide a way of increasing the probability of being able to start the engine.

The inventors herein have recognized the above-mentioned disadvantages of starting an engine of a hybrid vehicle with a sole electric machine and have developed an engine starting method, comprising: starting an engine with a first starting device in response to a high voltage system being capable of starting the engine, the first starting device having a higher torque capacity than a second starting device; and starting the engine with the second starting device in response to a DC/DC converter outputting a desired voltage.

By providing two electric machines and a DC/DC converter that can transfer power from a high voltage power system to a low voltage power system, it may be possible to provide the technical result of improving the possibility of engine starting. In one example, the output of the DC/DC converter may be a basis for determining that one of the two electric machines is ready to crank the engine. Alternatively, capability of a high voltage power system is assessed to determine which starting device should be used to start the engine. Thus, the engine may be cranked via the first or second electric machine depending on vehicle operating conditions. For example, an electric machine with a lower torque capacity may crank the engine if a high torque capacity electric machine is in a degraded condition.

The present description may provide several advantages. For example, the approach may provide a way of arbitrating which of two electrical machines is best suited to start an engine in response to present vehicle operating conditions. Additionally, the approach may include different arbitration schemes depending on if the engine is to be immediately started or started sometime after the vehicle has been activated. The approach may also provide improve vehicle durability by limiting use of an electric machine during selected conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
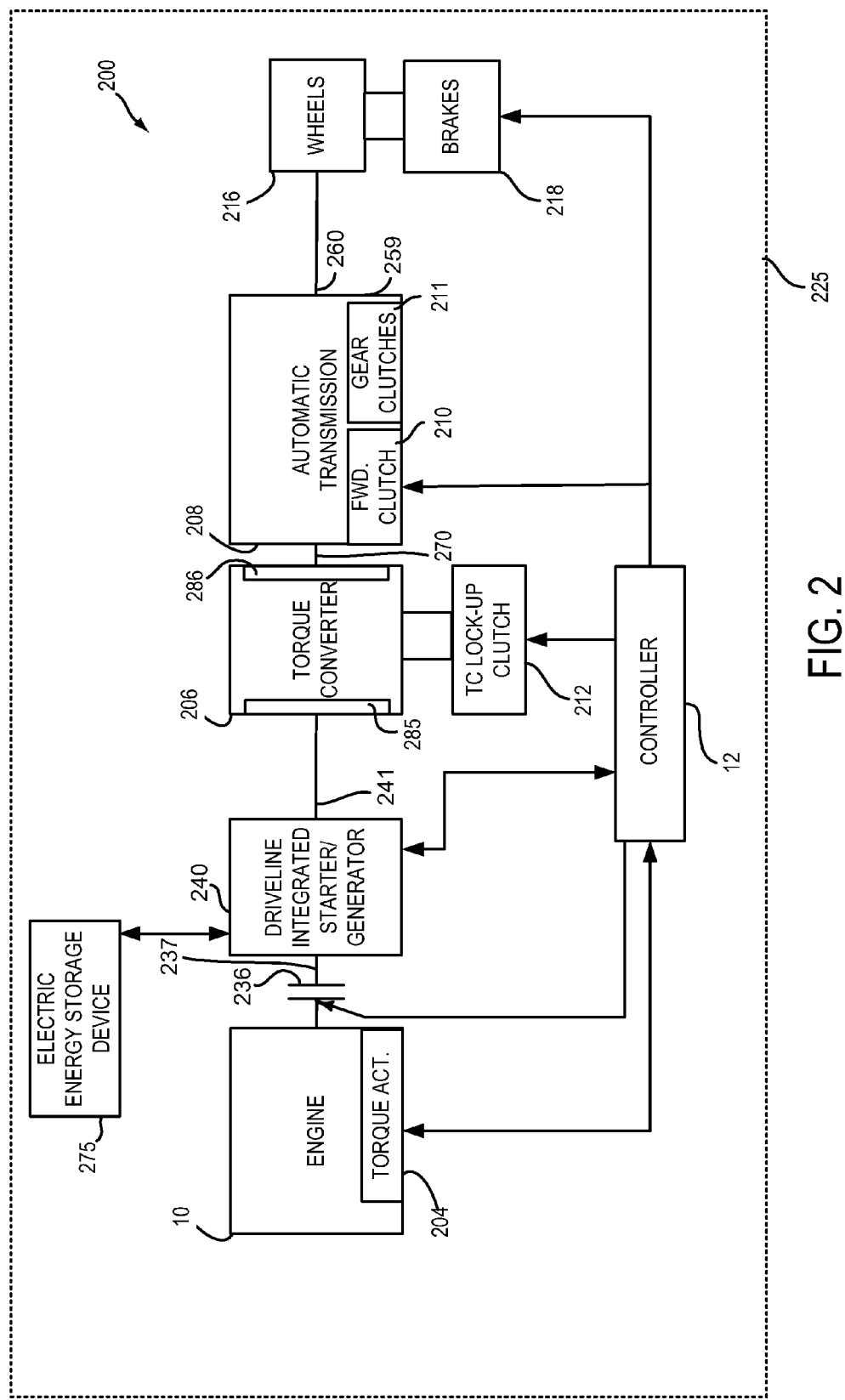
FIG. 2 shows an example vehicle driveline configuration.
Figure 3:
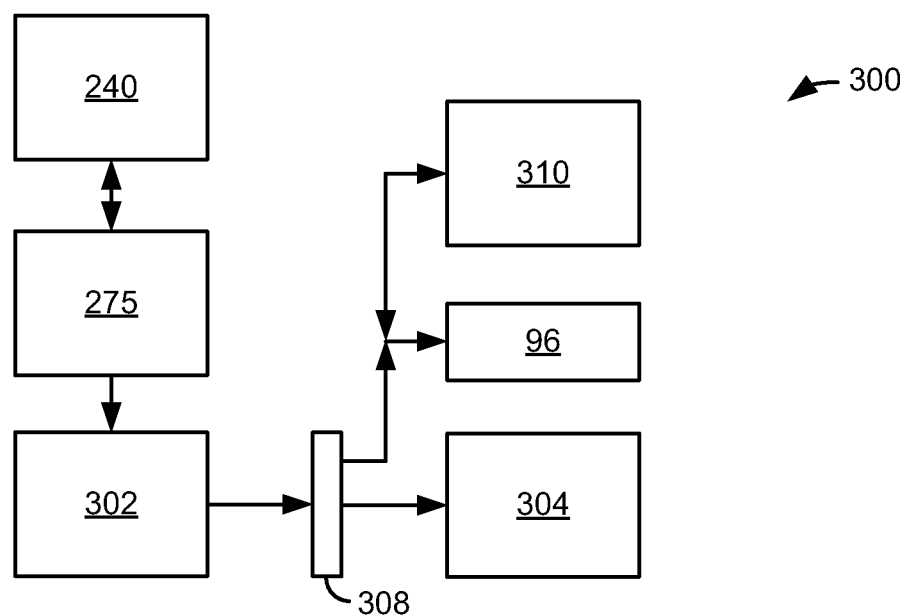
FIG. 3 shows an example electrical system for a hybrid vehicle.

The present description is related to improving hybrid vehicle engine starting. The engine may be of the type shown in FIG. 1. The engine may be selectively mechanically coupled to other vehicle components to form a driveline as is shown in FIG. 2. The vehicle may include an electrical system as is shown in FIG. 3. The vehicle's engine may be started according to the method of FIGS. 4 and 5. Simulated engine starting sequences are shown in FIG. 6.

Figure 1:
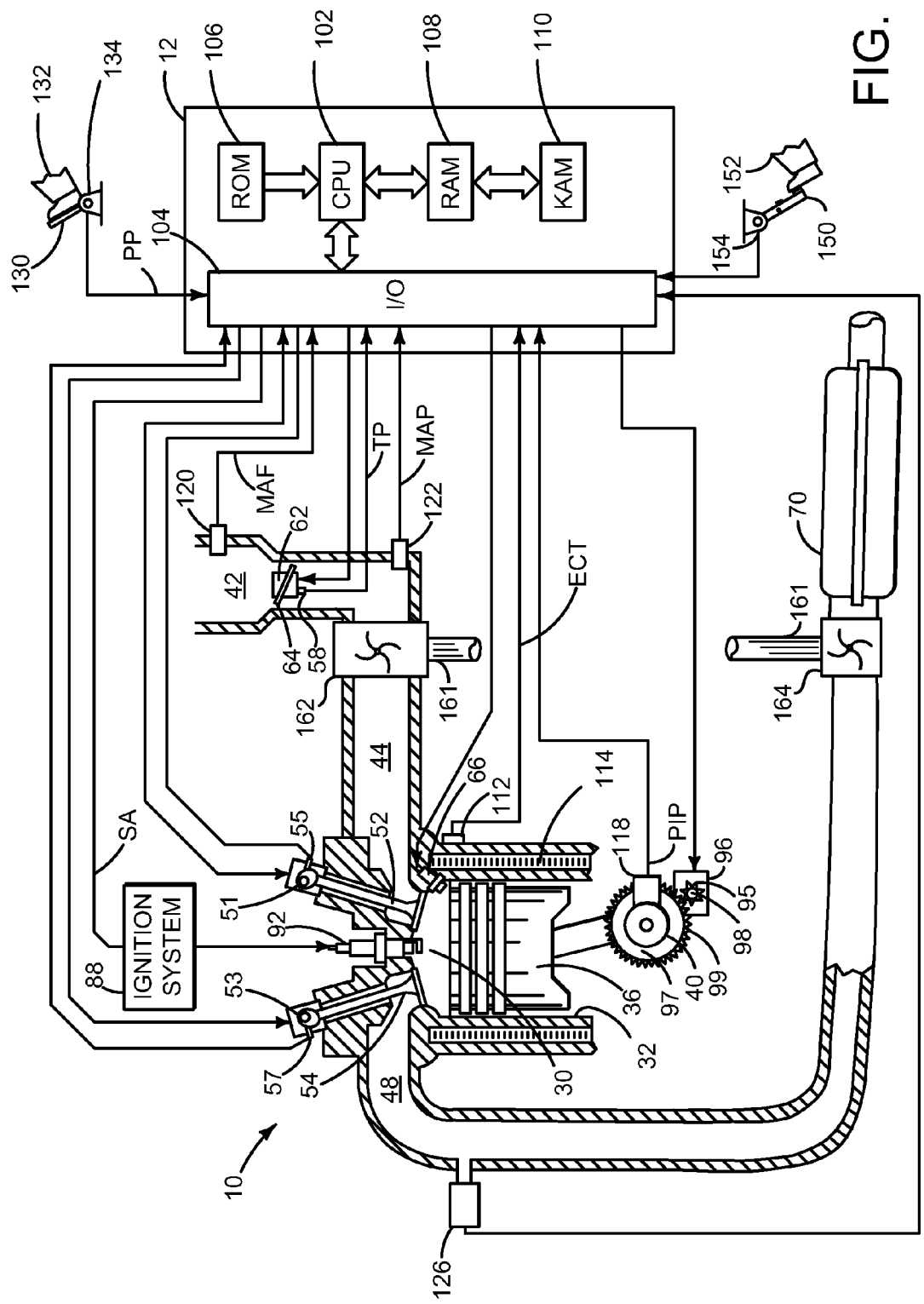
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Low voltage starter 96 includes pinion shaft 98 and pinion gear 95. Pinion shaft 98 may selectively advance pinion gear 95 to engage ring gear 99. Low voltage starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. The driveline of FIG. 2 includes engine 10 shown in FIG. 1. Driveline 200 may be powered by engine 10 within vehicle 225. Engine 10 may be started with an engine starting system shown in FIG. 1 or via driveline integrated starter/generator (DISG) 240. DISG 240 may also be referred to as an electric machine, motor, high voltage starter, and/or generator. Further, torque of engine 10 may be adjusted via torque actuator 204, such as a fuel injector, throttle, etc.

An engine output torque may be transmitted to an input side of driveline disconnect clutch 236. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

While the system of FIG. 2 shows a single controller 12, there may be examples where controller 12 is a vehicle controller that communicates with other dedicated controllers such as an engine controller, a transmission controller, brake controller, and climate controller.

Referring now to FIG. 3, a block diagram of an example hybrid vehicle electrical system is shown. The vehicle electrical system may be included in the system as is shown in FIGS. 1 and 2. Additionally, the electrical system may be operated according to the method of FIGS. 4 and 5.

Electric system 300 includes a high voltage battery 275 that supplies electrical power to DISG 240 of FIG. 2 and DC/DC converter 302. Thus, high voltage battery 275, DISG 240, and DC/DC converter 302 may comprise a high voltage system. High voltage is converted to low voltage by DC/DC converter 302 and supplied to electrical isolation device 308. The low voltage is directed to two different circuits, but additional circuits may be provided. A first low voltage circuit extends from isolation device 308 to low voltage electrical loads 304. Low voltage electrical loads may include but are not limited to cooling fans, vehicle lights, the vehicle instrument cluster, and selected vehicle sensors and actuators. A second low voltage circuit extends from the isolation device 308 to low voltage starter 96, as shown in FIG. 1, and low voltage battery 310. The first low voltage circuit may be electrically isolated from the second low voltage circuit.

In one example, electrical isolation device 308 may be comprised of relays and resistors. The relays may be selectively activated to allow charge to flow from DC/DC converter to the first low voltage circuit and/or the second low voltage circuit. For example, relays may be activated to allow current to flow to the first low voltage circuit but not to the second low voltage circuit. Alternatively, relays may be activated to allow current to flow to the second low voltage circuit but not to the first low voltage circuit. Additionally, current may be allowed to flow to both the first low voltage circuit and the second low voltage circuit or to neither low voltage circuit.

In some examples, resistors may be included to limit current flow to the first low voltage circuit or the second low voltage circuit from the DC/DC converter 302 when the engine is started via the low voltage starter 96. Further, the resistors may be switched into or out of conductors leading to the first low voltage and second low voltage circuit so that current flow to the first and second low voltage circuits may be limited by the resistors. Relays may be switched on and off via controller 12. In one example, relays are normally closed allowing current to flow from DC/DC converter 302 to low voltage load 304, starter 96, and low voltage battery 310. The relays may be activated to provide an open circuit between DC/DC converter 302 to low voltage load 304, starter 96, and low voltage battery 310. Alternatively, the relays and resistors may be activated to allow a small amount of current to flow from the DC/DC converter to starter 96 during engine starting.

By selectively activating relays or alternative similar devices within electrical isolation device 308, the low voltage battery 310 and starter 96 may be electrically isolated from DC/DC converter 302 and low voltage electrical loads 304. For example, during engine cranking, starter 96 may draw significant amounts of current that cause a reduction in the voltage of low voltage battery 310 and output voltage of DC/DC converter 302. However, by using electrical isolation device 308 to electrically isolate DC/DC converter 302 from starter 96 and low voltage battery 310, it may be possible to maintain the voltage output of DC/DC converter 302. Further, electrical isolation device 308 electrically isolates low voltage loads 304 from starter 96 and low voltage battery 310, thereby reducing the possibility of vehicle lights dimming or exhibiting other conditions that may be indicative of low voltage conditions.

Thus, the system of FIGS. 1-3 provides for a driveline system, comprising: an engine; a first electric machine having a first torque capacity; a second electric machine having a second torque capacity, the second torque capacity less than the first torque capacity, the second electric machine mechanically coupled to the engine; a high voltage battery selectively supplying charge to the first electric machine and the second electric machine; a DC/DC converter electrically coupled to the high voltage battery; a disconnect clutch for selectively coupling the engine and the first electric machine; and a controller including executable instructions stored in non-transitory memory for starting the engine with the second electric machine for a first engine start since engine stop in response to an operating state of the DC/DC converter, and instructions for increasing resistance between the DC/DC converter and the second electric machine.

The driveline system also includes where the resistance is increased without producing an open circuit between the DC/DC converter and the second electric machine. The driveline system further comprises additional instructions to deactivate low voltage loads electrically coupled to the DC/DC converter. The driveline system further comprises additional instructions to activate the low voltage loads electrically coupled to the DC/DC converter after starting the engine. The driveline system further comprises additional instructions to select a first or second engine starting strategy in response to whether or not the engine is immediately started. The driveline system further comprises additional instructions to assess capability of a high voltage system comprising the first electric machine, the high voltage battery, and the DC/DC converter to start the engine.

Figure 4:
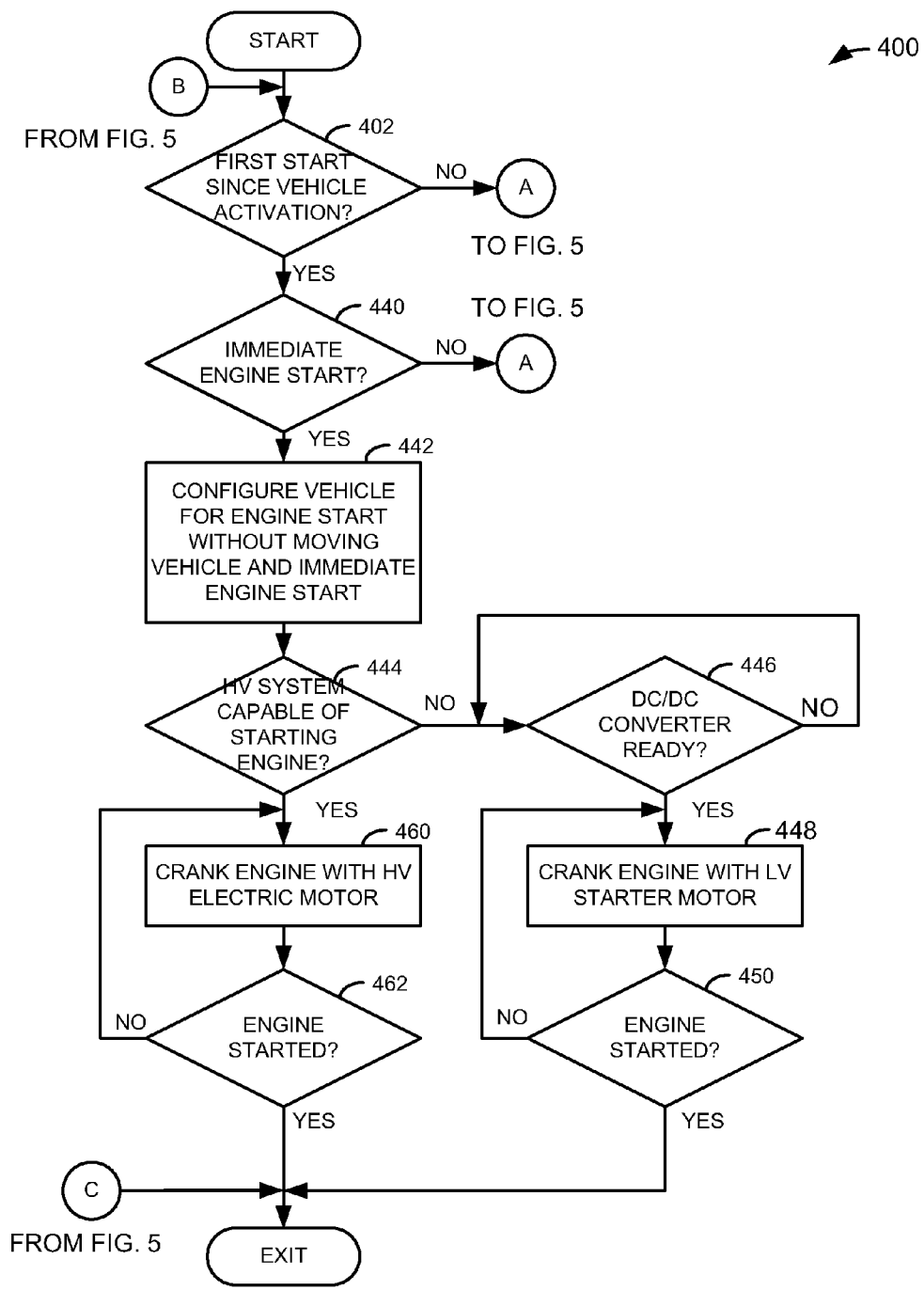
FIGS. 4 and 5 show an example method for starting an engine of a hybrid vehicle.
Figure 5:
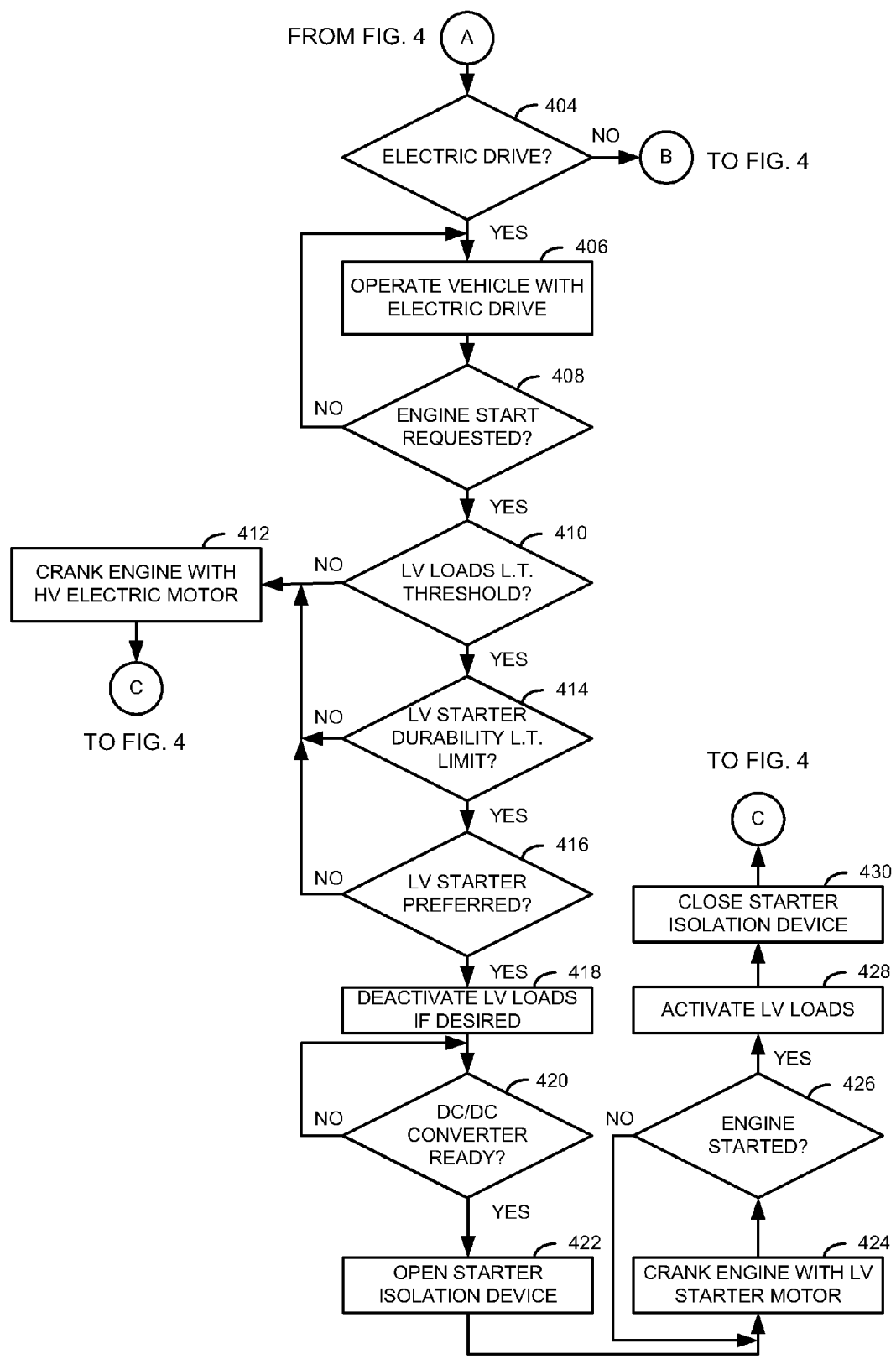
Figure 6:
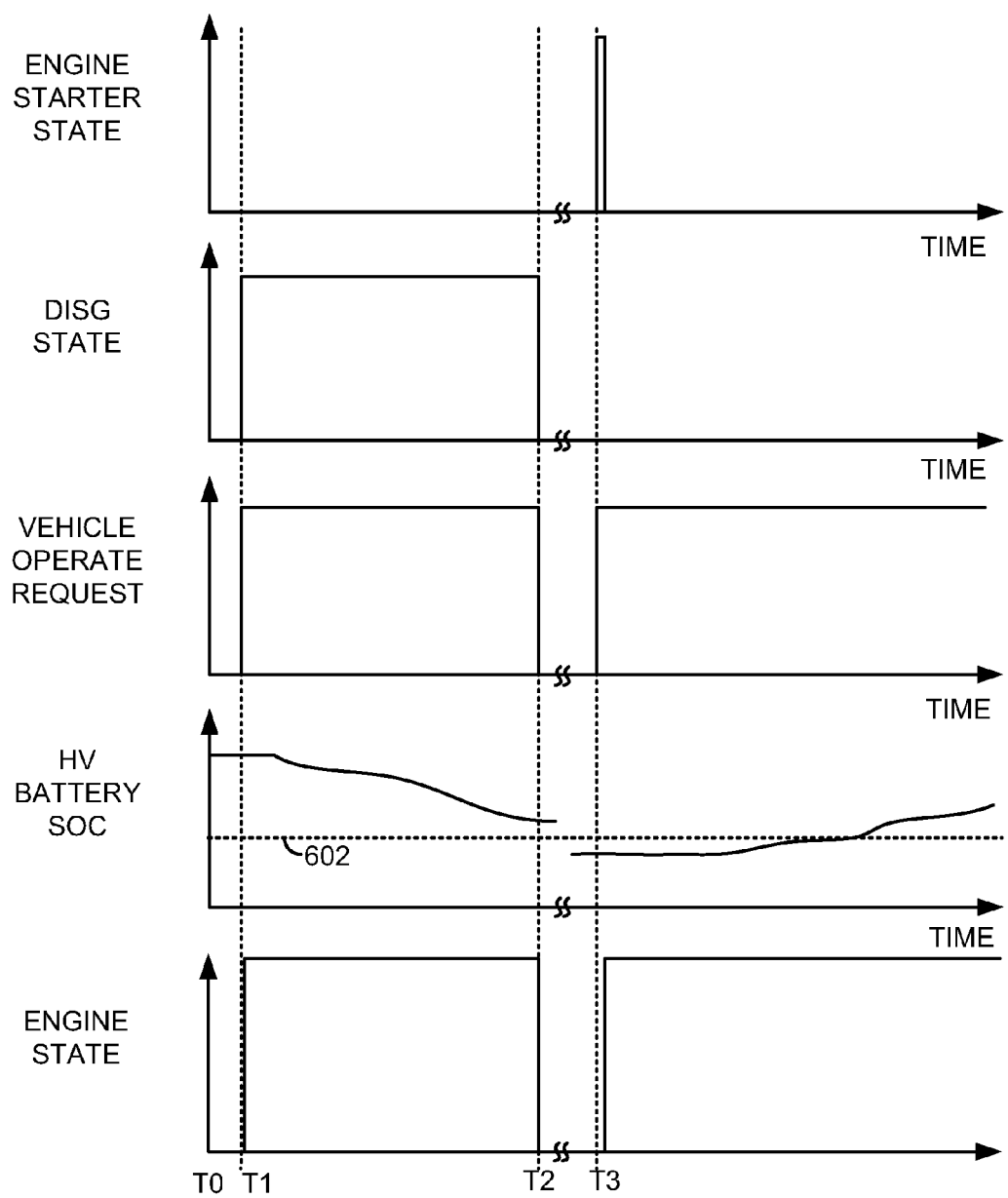
FIG. 6 shows a simulated engine operating sequence for the system of FIGS. 1 and 2 according to the method of FIGS. 4 and 5.

Referring now to FIGS. 4 and 5, an example method for starting an engine of a hybrid vehicle is shown. The method may be incorporated into the system of FIGS. 1-3 as executable instructions stored in non-transitory memory. Further, the method may provide the operating sequence shown in FIG. 6.

At 402, method 400 judges if the present internal combustion engine start request is a first start request since the vehicle is inactive. The vehicle may be activated via a driver installing a key or by bringing a device in proximity with the vehicle's passenger compartment. The vehicle may not travel when it is not activated. The vehicle may be inactivated by the driver removing a key from the vehicle or leaving the proximity of the vehicle with a device. If method 400 judges that the present engine start request is a first start request since the vehicle is inactive, the answer is yes and method 400 proceeds to 440. Otherwise, the answer is no and method 400 proceeds to 404.

At 404, method 400 judges if the electric drive is to propel the vehicle without assistance from the engine. The electric drive may be the DISG or a different electric machine in other vehicle configurations. In one example, method 400 judges if the electric drive is to propel the vehicle based on conditions including but not limited to driver demand torque, SOC, and vehicle mass. If method 400 judges that the vehicle is to be operated solely with electric drive, the answer is yes and method 400 proceeds to 406. Otherwise, the answer is no and method 400 returns to 402.

At 406, method 400 operates the vehicle with the electric machine as the vehicle's propulsion source. In one example, driver demand torque is determined based on accelerator pedal position and vehicle speed. The electric machine torque is adjusted based on the driver demand torque. Method 400 proceeds to 408 after the vehicle begins to operate with the electric machine as a propulsion source.

At 408, method 400 judges if an engine start is requested. An engine start may be requested based on driver demand torque exceeding a threshold torque, SOC, catalyst conditions, passenger compartment conditions (e.g., a request for passenger compartment warming), and other vehicle conditions. If method 400 judges that an engine start request is present, the answer is yes and method 400 proceeds to 410. Otherwise, the answer is no and method 400 returns to 406.

At 410, method 400 judges if low voltage (LV) electrical loads in the system of FIG. 3 are less than (L.T.) a threshold. In one example, method 400 may judge if low voltage electrical loads (e.g., fans, lights, sensors, and actuators) current requirements are less than a threshold current amount. In other examples, method 400 may simply determine a number of low voltage consumers that are requesting or consuming electrical current. If method 400 judges that low voltage loads are less than a threshold, the answer is yes and method 400 proceeds to 414. Otherwise, the answer is no and method 400 proceeds to 412.

At 412, method 400 cranks the engine via the high voltage electric machine (e.g., the DISG). In one example, the electric machine rotates the engine by at least partially closing a driveline disconnect clutch and rotating the electric machine. The driveline disconnect clutch transfers torque from the electric machine to the engine as the driveline disconnect clutch closes. The engine may be rotated at a cranking speed (e.g., 200 RPM) until the engine starts or it may be accelerated up to engine idle speed. Spark and fuel may be supplied to the engine at the cranking speed, during acceleration up to engine idle speed, or once the engine reaches idle speed. Method 400 proceeds to exit after cranking and engine starting.

At 414, method 400 judges if low voltage starter durability is less than a limit. In one example the low voltage starter durability may be based on a number of engine starts during a driving period when the vehicle is activated without being deactivated, starter temperature, time between engine starts during a driving period when the vehicle is activated without being deactivated, and/or other conditions. For example, method 400 may reduce a value of low voltage starter durability parameter in response to a number of engine starts performed by a low voltage starter in a predetermined period. If method 400 judges that the value of the durability parameter is less than a predetermined value, it may be judged that low voltage starter durability is less than a limit. If method 400 judges that low voltage starter durability is less than the limit, the answer is yes and method 400 proceeds to 416. Otherwise, the answer is no and method 400 proceeds to 412.

At 416, method 400 judges if engine starting via the low voltage starter is preferred based on the present vehicle operating conditions. During some conditions, engine starting via the low voltage starter may be preferable as compared to starting the engine via the DISG or high voltage electrical machine. For example, it may be more desirable to start the engine via the low voltage starter when ambient temperature is less than a threshold temperature, or when the high voltage battery SOC is low, or when the DISG is consuming a relatively large amount of current to propel the vehicle, or during other selected conditions. If method 400 judges that engine starting via the low voltage starter is preferred, the answer is yes and method 400 proceeds to 418. Otherwise, the answer is no and method 400 proceeds to 412.

At 418, method 400 may deactivate selected low voltage loads. The low voltage loads may include but are not limited to vehicle lights, fans, displays, sensors, and actuators. The low voltage loads may be deactivated by preventing or limiting current flow to the low voltage devices. Current flow to low voltage devices may be limited via relays or switching devices such as transistors. If method 400 decides to deactivate selected low voltage loads, the low voltage loads are deactivated at 418. In one example, isolation device 308 deactivates the low voltage loads. Method 400 proceeds to 420 after selected low voltage loads are deactivated.

At 420, method 400 judges if the DC/DC converter providing DC power to the low voltage battery, low voltage loads, and the low voltage starter is ready to output a DC voltage. In one example, method 400 may judge that the DC/DC converter is ready to perform based on voltage output from the DC/DC converter. If the output voltage of the DC/DC converter is within a threshold voltage of the desired DC/DC converter output voltage, the answer is yes and method 400 proceeds to 422. Otherwise, the answer is no and method 400 returns to 420. In other examples, other conditions may be a basis for judging whether or not the DC/DC converter is ready to supply current and voltage to the low voltage battery, low voltage loads, and the low voltage starter. For example, the DC/DC converter may be judged ready when voltage has been supplied to the DC/DC converter or a predetermined amount of time since voltage has been applied to the DC/DC converter.

At 422, method 400 opens a normally closed starter isolation device (e.g., 308 of FIG. 3) to electrically isolate the low voltage starter from the DC/DC converter (e.g., 302 of FIG. 3). By opening the normally closed starter isolation device, it may be possible to prevent voltage sag or reduction at the output of the DC/DC converter. Further, the electrical load of the low voltage starter is not applied to the high voltage battery (e.g., 275 of FIG. 3) or the low voltage electrical loads.

Alternatively, method 400 may increase an amount of resistance between the DC/DC converter and the low voltage starter so that the low voltage starter is supplied a small amount of current from the DC/DC converter such that output voltage of the DC/DC converter is reduced by less than one volt when low voltage starter is cranking the engine. The resistance may be increased by switching resistors into the circuit between the low voltage starter and the DC/DC converter. The resistance between the low voltage starter and the DC/DC converter may be increased without producing an open circuit between the low voltage starter and the DC/DC converter. Method 400 proceeds to 424 after the starter isolation device is opened.

At 424, method 400 cranks the engine via the low voltage starter motor (e.g., 96 of FIG. 10). The low voltage starter motor may crank the engine without assistance of the DISG. In some examples, the driveline disconnect clutch is open when the engine is cranked by the low voltage starter motor. Fuel and spark may be supplied to the engine before and during engine cranking to start the engine. Method 400 proceeds to 426 after beginning to crank the engine via the low voltage starter.

At 426, method 400 judges if the engine is started. The engine may be judged to be started if engine speed exceeds a predetermined speed. If method 400 judges that the engine is started, the answer is yes and method 400 proceeds to 428. Otherwise, the answer is no and method 400 returns to 424 to continue engine cranking.

At 428, method 400 activates low voltage electrical loads that were deactivated at 418. The low voltage electrical loads may be activated by supplying current to the low voltage electrical loads. In one example, relays or switches are closed to reactivate low voltage electrical loads. Method 400 proceeds to 430 after activating the low voltage electrical loads.

At 430, method 400 closes the starter isolation device to allow electrical communication between output of the DC/DC converter and the low voltage battery and the low voltage starter. In some examples, the starter isolation device is closed a predetermined period of time after the engine is started. Thus, the DISG is electrically coupled to the starter motor via the DC/DC converter. Additionally, method 400 may close a driveline disconnect clutch after the engine is started and at a same speed as the DISG. Method 400 proceeds to exit after the starter isolation device is closed.

At 440, method 400 judges if the present engine start request is for an immediate engine start. In one example, an immediate engine start may be requested when battery state of charge SOC is low and a driver activates the vehicle by installing a key or entering the proximity of the vehicle and requests vehicle activation in less than a predetermined amount of time (e.g., 2 seconds). In other examples, an immediate engine start may be requested when the driver activates the vehicle and the engine has not been started within a threshold amount of time, or when the driver activates the vehicle and passenger cabin heat is requested, or when the driver activates the vehicle and degradation of the electrical propulsion system is degraded, or during other conditions. If method 400 judges that an immediate engine start is requested, the answer is yes and method 400 proceeds to 442. Otherwise, the answer is no and method 400 proceeds to 404.

At 442, method 400 configures the vehicle to start without moving the vehicle and with an immediate engine start. Method 400 prepares the vehicle for starting without moving the vehicle. The engine may be started without moving the vehicle when the transmission is in park or neutral. The vehicle may be automatically shifted into park or neutral to allow the engine to start without moving the vehicle. In some examples, engine starting may be prohibited for a first engine start since the vehicle was deactivated if the transmission is not in park or neutral. Method 400 proceeds to 444 after the vehicle is prepared for starting.

At 444, method 400 judges whether or not the high voltage system is capable of or has the ability to start the vehicle engine. In one example, method 400 judges if the high voltage system is capable of starting the vehicle engine based on battery SOC. In addition or in another example, method 400 may judge if the high voltage system is indicating a condition of degradation (e.g., inoperable DISG, inverter degradation, tripped fuse or circuit breaker, and/or controller degradation), if so it may be judged that the high voltage system may be judged incapable of starting the vehicle engine. If method 400 judges that the high voltage system is capable of starting the vehicle engine, the answer is yes and method 400 proceeds to 460. Otherwise, the answer is no and method 400 proceeds to 446.

At 446, method 400 judges if the DC/DC converter providing DC power to the low voltage battery, low voltage loads, and the low voltage starter is ready to output a DC voltage. In one example, method 400 may judge that the DC/DC converter is ready to perform based on voltage output from the DC/DC converter. If the output voltage of the DC/DC converter is within a threshold voltage of the desired DC/DC converter output voltage, the answer is yes and method 400 proceeds to 448. Otherwise, the answer is no and method 400 returns to 446. In other examples, other conditions may be a basis for judging whether or not the DC/DC converter is ready to supply current and voltage to the low voltage battery, low voltage loads, and the low voltage starter. For example, the DC/DC converter may be judged ready when voltage has been supplied to the DC/DC converter or a predetermined amount of time since voltage has been applied to the DC/DC converter.

At 448, method 400 cranks the engine via the low voltage starter motor (e.g., 96 of FIG. 10). The low voltage starter motor may crank the engine without assistance of the DISG. In some examples, the driveline disconnect clutch is open when the engine is cranked by the low voltage starter motor. Fuel and spark may be supplied to the engine before and during engine cranking to start the engine. Method 400 proceeds to 450 after beginning to crank the engine via the low voltage starter.

At 450, method 400 judges if the engine is started. The engine may be judged to be started if engine speed exceeds a predetermined speed. If method 400 judges that the engine is started, the answer is yes and method 400 proceeds to exit. Otherwise, the answer is no and method 400 returns to 448 to continue engine cranking Additionally, method 400 may close a driveline disconnect clutch after the engine is started and at a same speed as the DISG.

At 460, method 400 cranks the engine via the high voltage electric machine (e.g., the DISG). In one example, the electric machine rotates the engine by at least partially closing a driveline disconnect clutch and rotating the electric machine. The driveline disconnect clutch transfers torque from the electric machine to the engine as the driveline disconnect clutch closes. The engine may be rotated at a cranking speed (e.g., 200 RPM) until the engine starts or it may be accelerated up to engine idle speed. Spark and fuel may be supplied to the engine at the cranking speed, during acceleration up to engine idle speed, or once the engine reaches idle speed. Method 400 proceeds to 462 after beginning to crank the engine.

At 462, method 400 judges if the engine is started. The engine may be judged to be started if engine speed exceeds a predetermined speed. If method 400 judges that the engine is started, the answer is yes and method 400 proceeds to exit. Otherwise, the answer is no and method 400 returns to 460 to continue engine cranking Additionally, method 400 may close a driveline disconnect clutch after the engine is started and at a same speed as the DISG.

Thus, the method of FIGS. 4 and 5 provides for an engine starting method, comprising: starting an engine with a first starting device in response to a high voltage system being capable of starting the engine, the first starting device having a higher torque capacity than a second starting device; and starting the engine with the second starting device in response to a DC/DC converter outputting a desired voltage. The method includes where the start is a first engine start since engine stop in response to activation of a vehicle in which the engine operates. The method also includes where the first starting device is a driveline integrated starter/generator and where the second starting device is a starter motor that is mechanically coupled to the engine.

In some examples, the method further comprises selecting the second starting device in response to a high voltage system being incapable of starting the engine. The includes where the high voltage system is judged incapable of starting the engine based on a condition of degradation. The method further comprises electrically isolating the first starting device from the second starting device while starting the engine. The method further comprises electrically coupling the first starting device and the second starting device in response to the engine being started.

The method of FIG. 4 also provides for an engine starting method, comprising: starting an engine with a first starting device for a first engine start since vehicle deactivation, the first starting device having a higher torque capacity than a second starting device; starting the engine with a second starting device after said first engine start; and starting the engine with the first starting device after starting the engine with the second starting device in response to a reduced durability indication. The method includes where the indication of reduced durability is based on a number of engine starts during a driving period when the vehicle is activated without being deactivated. The method includes where the indication of reduced durability is based an amount of time between engine starts during a driving period when the vehicle is activated without being deactivated.

In some examples, the method includes where the indication of reduced durability is based on a starter temperature. The method further comprises starting the engine after selecting the second starting device in response to the first starting device having insufficient capacity to start the engine. The method includes where the second starting device is electrically isolated from the first starting device in response to selecting the second starting device and where the second starting device is not electrically isolated from the first starting device when the first starting device is selected. The method further comprises closing a driveline disconnect clutch in response to selecting the first starting device.

Referring now to FIG. 6, sequences for starting an engine according to the method of FIGS. 4 and 5 is shown. The method of FIG. 6 may be performed via a system as is shown in FIGS. 1-3. The double S at the center of each plot indicates a discontinuity in time.

The first plot from the top of FIG. 6 is a plot of engine starter state versus time. The engine starter is engaged and activated when the engine starter trace is at a higher level near the Y axis arrow. The Y axis represents engine starter state. The X axis represents time and time increases from the left to right side of the plot.

The second plot from the top of FIG. 6 is a plot of DISG state versus time. The DISG is activated when the DISG trace is at a higher level near the Y axis arrow. The Y axis represents DISG state. The X axis represents time and time increases from the left to right side of the plot.

The third plot from the top of FIG. 6 is a plot of a driver vehicle activation request state versus time. The driver vehicle activation request may be a basis for an engine start request. The driver vehicle activation request is asserted when the driver vehicle activation request is at a higher level near the Y axis arrow. The Y axis represents driver operate state request state. The X axis represents time and time increases from the left to right side of the plot.

The fourth plot from the top of FIG. 6 is a plot of high voltage battery SOC versus time. The battery SOC is at a higher level when the battery SOC trace is at a higher level near the Y axis arrow. The Y axis represents high voltage SOC. The X axis represents time and time increases from the left to right side of the plot. Horizontal line 602 represents a battery SOC below which the DISG is not operated to start the engine.

The fifth plot from the top of FIG. 6 is a plot of engine state versus time. The engine is activated when the engine state trace is at a higher level near the Y axis arrow. The Y axis represents engine state. The X axis represents time and time increases from the left to right side of the plot.

At time T0, the engine is not operating as indicated by the engine state trace being at a lower level. The engine starter is not engaged and the DISG is not activated. Additionally, the vehicle operate request is not asserted and the high voltage battery SOC is at a higher level. Thus, at time T0, the vehicle is not operating.

At time T1, the vehicle operate request trace transitions to a higher level indicating the driver wishes to operate the vehicle. The vehicle operate request may be asserted in response to a driver installing a key into the vehicle or when the driver is proximate to the vehicle with a remote vehicle activation device. The DISG transitions to a higher level in response to the vehicle operate request and vehicle conditions. In particular, since battery SOC is high, it may be determined that the DISG has the capacity to start the engine. The DISG rotates the engine after the driveline disconnect clutch is closed and the engine state transitions to a high level to indicate that the engine was started via the DISG.

At time T2, the vehicle operate request transitions to a low level in response to a driver removing a vehicle key or leaving the proximity of the vehicle. The DISG state and the engine state are transitioned to low levels to indicate that the DISG and engine are not operating. The high voltage battery SOC is at a reduced level and the engine starter is not engaged.

At time T3, the vehicle operate request transitions to a high level to indicate the driver wishes to operate the vehicle. The engine starter state transitions to a high level to indicate that the starter is engaged in response to the vehicle operate request and the low high voltage battery SOC. Shortly thereafter, the engine state is transitioned to a high level to indicate that the engine is started. The DISG state remains low indicating that the DISG is not activated and the starter state transitions to a low level in response to the engine being started.

Thus, a hybrid vehicle that includes a DISG and a low voltage starter motor may be started via different starting devices in response to vehicle conditions. The low voltage starter may be electrically isolated from the high voltage system during engine starting. Alternatively, the low voltage starter may be deactivated while a high voltage electric machine cranks the engine.

As will be appreciated by one of ordinary skill in the art, the methods described in FIGS. 4 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine starting method, comprising:
    starting an engine with a first starting device in response to a high voltage system being capable of starting the engine, the first starting device having a higher torque capacity than a second starting device; and
    starting the engine with the second starting device in response to a DC/DC converter outputting a desired voltage; wherein
    the high voltage system is judged capable of starting the engine based on a state of charge and a condition of degradation of the high voltage system.

2. The method of claim 1, where the start is a first engine start since engine stop in response to activation of a vehicle in which the engine operates.

3. The method of claim 2, where the first starting device is a driveline integrated starter/generator and where the second starting device is a starter motor that is mechanically coupled to the engine.

4. The method of claim 1, further comprising selecting the second starting device in response to the high voltage system being incapable of starting the engine, the high voltage system being judged incapable of starting the engine when the state of charge is lower than a threshold.

5. The method of claim 4, where the high voltage system is judged incapable of starting the engine based on the condition of degradation, the condition of degradation being based on one or more of the first starting device being inoperable, a tripped fuse or circuit breakers, or controller degradation.

6. The method of claim 1, further comprising electrically isolating the first starting device from the second starting device while starting the engine.

7. The method of claim 6, further comprising electrically coupling the first starting device and the second starting device in response to the engine being started.

8. An engine starting method, comprising:
    starting an engine with a first starting device for a first engine start since vehicle deactivation, the first starting device having a higher torque capacity than a second starting device;
    starting the engine with a second starting device after said first engine start; and
    starting the engine with the first starting device after starting the engine with the second starting device in response to a reduced durability indication; wherein
    the reduced durability indication is based on a number of engine starts during a driving period when the vehicle is activated without being deactivated, and where the reduced durability indication is a reduced durability indication for the second starting device.

9. The method of claim 8, where the reduced durability indication is based an amount of time between engine starts during a driving period when the vehicle is activated without being deactivated.

10. The method of claim 8, where the reduced durability indication is based on a starter temperature.

11. The method of claim 8, where the engine is started with the second starting device in response to the first starting device having insufficient capacity to start the engine.

12. The method of claim 11, where the second starting device is electrically isolated from the first starting device in response to starting the engine with the second starting device and where the second starting device is not electrically isolated from the first starting device when the engine is started with the first starting device.

13. The method of claim 8, further comprising closing a driveline disconnect clutch in response to starting the engine with the first starting device.

14. A driveline system, comprising:
    an engine;
    a first electric machine having a first torque capacity;
    a second electric machine having a second torque capacity, the second torque capacity less than the first torque capacity, the second electric machine mechanically coupled to the engine;
    a high voltage battery selectively supplying charge to the first electric machine and the second electric machine;
    a DC/DC converter electrically coupled to the high voltage battery;
    a disconnect clutch for selectively coupling the engine and the first electric machine; and
    a controller including executable instructions stored in non-transitory memory for starting the engine with the second electric machine for a first engine start since engine stop in response to an output voltage of the DC/DC converter being greater than a threshold, and instructions for increasing resistance between the DC/DC converter and the second electric machine.

15. The driveline system of claim 14, where the resistance is increased without producing an open circuit between the DC/DC converter and the second electric machine.

16. The driveline system of claim 14, further comprising additional instructions to deactivate low voltage loads electrically coupled to the DC/DC converter.

17. The driveline system of claim 16, further comprising additional instructions to activate the low voltage loads electrically coupled to the DC/DC converter after starting the engine.

18. The driveline system of claim 15, further comprising additional instructions to start the engine with a first or second engine starting strategy in response to whether or not the engine is immediately started and whether or not low voltage loads are less than a threshold.

19. The driveline system of claim 15, further comprising additional instructions to assess capability of a high voltage system for starting the engine, the high voltage system comprising the first electric machine, the high voltage battery, and the DC/DC converter to start the engine, the instructions including starting the engine with the second electric machine in response to a state of charge of the high voltage battery being below a threshold.

* * * * *